United States Patent
Ooyama

(10) Patent No.: US 7,152,641 B2
(45) Date of Patent: Dec. 26, 2006

(54) HEAVY-DUTY PNEUMATIC TIRE HAVING NON-CONTACT RIB AND SHOULDER BLOCKS

(75) Inventor: Toshiro Ooyama, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 172 days.

(21) Appl. No.: 10/885,619

(22) Filed: Jul. 8, 2004

(65) Prior Publication Data

US 2005/0006016 A1    Jan. 13, 2005

(30) Foreign Application Priority Data

Jul. 9, 2003    (JP) ............... 2003-194555

(51) Int. Cl.
*B60C 11/01*    (2006.01)
*B60C 11/11*    (2006.01)

(52) U.S. Cl. .............. 152/209.16; 152/209.22; 152/209.23; 152/209.27

(58) Field of Classification Search ........... 152/209.16, 152/209.22, 209.23, 209.27
See application file for complete search history.

(56) References Cited

U.S. PATENT DOCUMENTS 4,480,671 A *   11/1984   Giron ............... 152/209.16
5,522,442 A *    6/1996   Kishi ............... 152/209.16
5,660,652 A *    8/1997   Young et al. ....... 152/209.16
6,109,316 A *    8/2000   Janajreh ........... 152/209.16
6,408,909 B1*    6/2002   Nguyen ............. 152/209.16
6,481,480 B1*   11/2002   Schuster et al. .... 152/209.27
2004/0112493 A1*  6/2004   Warchol et al. .... 152/209.16

FOREIGN PATENT DOCUMENTS

| JP | 06-297917 A1 | 10/1994 |
| JP | 11-34614 | * 2/1999 |
| JP | 2003-341305 | * 12/2003 |

* cited by examiner

*Primary Examiner*—Steven D. Maki
(74) *Attorney, Agent, or Firm*—Rader, Fishman & Grauer PLLC

(57) ABSTRACT

A heavy-duty pneumatic tire designed to suppress the occurrence of heel-and-toe wear in the shoulder blocks while maintaining good drainage and traction performance through the final stage of the wear life. In this heavy-duty pneumatic tire, whose shoulder portion is divided into a plurality of shoulder blocks in the tire circumferential direction, and wherein the depth of the lug groove between each two adjacent of the shoulder blocks is set to be equal to the depth of main the grooves, a non-contact rib is provided, in a serial configuration in the tire circumferential direction, to a buttress portion outside a ground contact width, so as to come into contact with the side faces of the shoulder blocks in the state that the tire is in contact with the ground with a specified inflation pressure and a specified load.

3 Claims, 2 Drawing Sheets

HEAVY-DUTY PNEUMATIC TIRE HAVING NON-CONTACT RIB AND SHOULDER BLOCKS

BACKGROUND OF THE INVENTION

The present invention relates to a heavy-duty pneumatic tire used for trucks, buses, and the like. Specifically, the present invention relates to a heavy-duty pneumatic tire which suppresses the occurrence of heel-and-toe wear in the shoulder blocks while maintaining the good drainage and traction performance through the final stage of the wear life.

In recent years, heavy-duty pneumatic tires are increasingly used under conditions of high speed oriented running. In a heavy-duty pneumatic tire, putting importance on the traction performance, which includes a number of lug grooves extended in the tire width direction in the tread portion, a problem of heel-and-toe wear occurring in the shoulder blocks has been conspicuous. In particular, in the case that lug grooves with a depth equal to that of the main grooves are provided to the shoulder portion in order to maintain the drainage and traction performance through the final stage of the wear life, the rigidity of the shoulder blocks in the tire circumferential direction is reduced, and the shoulder blocks move to a larger extent while the tire is rolling. Accordingly, it is likely that the heel-and-toe wear occurs.

As means for suppressing the occurrence of such heel-and-toe wear, the following has been proposed and turned into a practice; the suppressing of the movement of the shoulder blocks by providing an elevation, which is lower than the shoulder blocks, to the lug groove between each two adjacent of the shoulder blocks (for example, see Japanese Patent Laid-Open Publication No. 6-297917).

However, the elevation needs to be formed across most part of each lug groove in order to sufficiently suppress the movement of the shoulder blocks. Consequently, significant reduction of the drainage and the traction performance was unavoidable after the middle stage of the wear life.

SUMMARY OF THE INVENTION

An object of the present invention is to provide a heavy-duty pneumatic tire which can suppress the occurrence of heel-and-toe wear in the shoulder blocks while maintaining good drainage and traction performance through the final stage of the wear life.

A heavy-duty pneumatic tire of the present invention to solve the aforementioned problem is a pneumatic tire, whose shoulder portion is divided into a plurality of shoulder blocks in the tire circumferential direction, and in which the depth of the lug grooves between the shoulder blocks is set to be equal to the depth of the main grooves. The heavy-duty pneumatic tire includes a non-contact rib which is provided, in a serial configuration in the tire circumferential direction, to the buttress portion outside the ground contact width so that the non-contact rib comes into contact with the side faces of the shoulder blocks in a state that the tire is in contact with the ground with a specified inflation pressure and a specified load.

In the pneumatic tire of the present invention, the non-contact rib formed in the buttress portion supports the shoulder blocks, divided by the lug grooves, at the side faces thereof in the state that the tire is in contact with the ground. This virtually increases the rigidity of the shoulder blocks to suppress the occurrence of the heel-and-toe wear in the shoulder blocks. In addition, while the occurrence of the heel-and-toe wear is suppressed by the above non-contact rib, the depth of the lug groove between each two adjacent of the shoulder blocks is set to be equal to the depth of the main grooves, so that good drainage and traction performance can be maintained through the final stage of the wear life.

In the present invention, in order to effectively suppress the occurrence of the heel-and-toe wear, it is preferable that the height d of the non-contact rib to the depth D of the main grooves satisfies a relation of $0.2 \leq d/D \leq 0.5$, and the distance Y between the non-contact rib and the shoulder blocks satisfy a relation of $0.2 \leq Y/d \leq 0.7$.

The state that a tire is in contact with the ground with a specified inflation pressure and a specified load is, for example, a state that the tire is in contact with the ground based on an inflation pressure and a load specified in a correspondence table of inflation pressure and load capacity in the JATMA year book (an edition of Year 2002).

DETAILED DESCRIPTION OF THE PREFERRED EMBODIMENTS

A description will be given of a configuration of the present invention in detail below with reference to the accompanying drawings.

Figure 1:
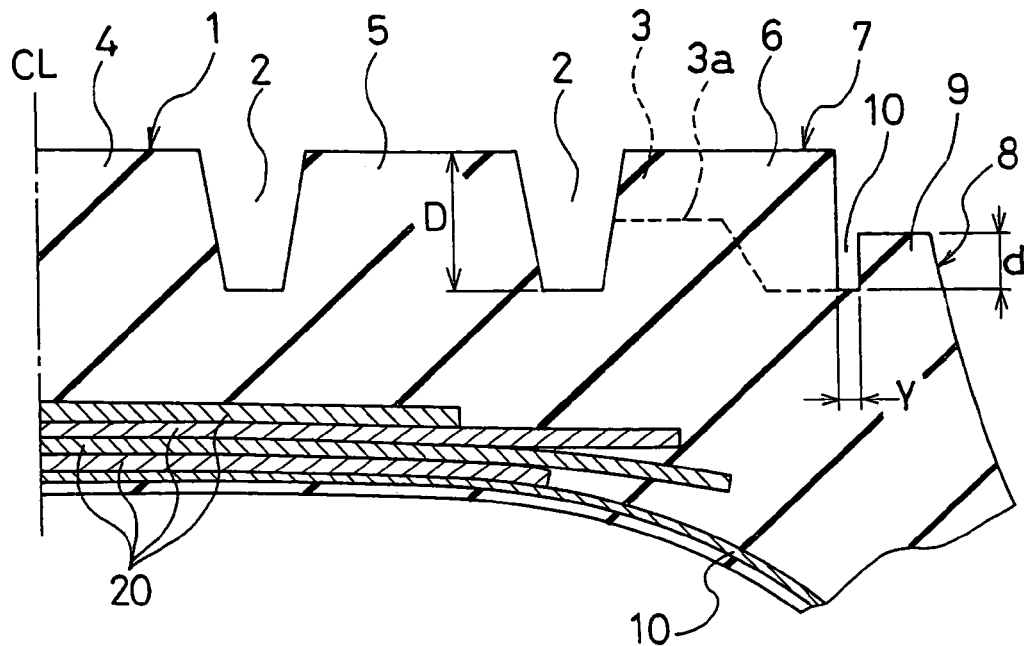
FIG. 1 is a cross-sectional view showing a main portion of a pneumatic tire according to an embodiment of the present invention.
Figure 2:
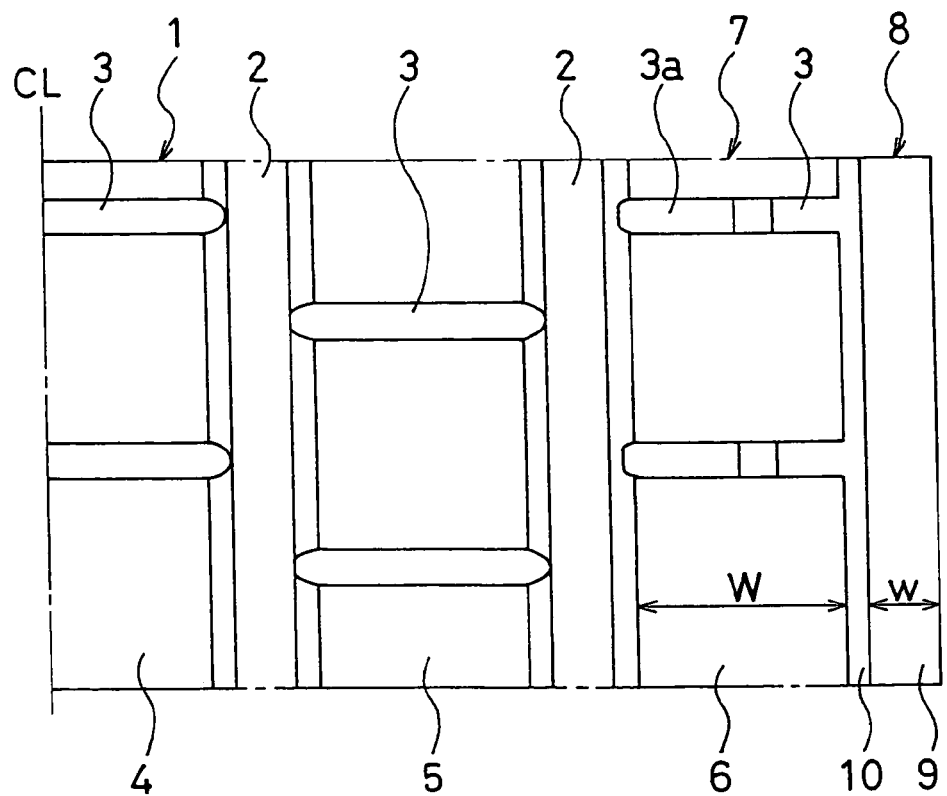
FIG. 2 is a planar view showing a main portion of a tread pattern of the pneumatic tire according to the embodiment of the present invention.

FIGS. 1 and 2 show a main portion of a pneumatic tire according to an embodiment of the present invention. In FIGS. 1 and 2, a reference code CL denotes the tire center line. Reference numerals 11 and 12 denote a carcass layer and a belt layer, respectively. The internal structure of the tire including the carcass layer 11 and the belt layer 12 is not particularly limited.

As shown in FIGS. 1 and 2, a plurality of main grooves 2 extended in the tire circumferential direction and a plurality of lug grooves 3 extended in the tire width direction are formed in a tread portion 1. The three rows of blocks are formed, by the main and lug grooves, from the center side to the shoulder side in the tread portion 1. Specifically, a plurality of blocks 4 are formed in the tire circumferential direction on the center side of the tread portion 1. Next to these, a plurality of blocks 5 are formed in the tire circumferential direction, and further a plurality of blocks 6 are formed in the tire circumferential direction on the shoulder side.

An elevation 3a is provided in each of the lug grooves 3 located in a shoulder portion 7 so as to partially link each two of the shoulder blocks 6 and 6 which are adjacent to each other in the tire circumferential direction. The elevation 3a is selectively provided only to part of each lug groove 3 on the center side of the tread. Moreover, the portion, except for elevation 3a, of each lug groove 3 has a depth equal to that of the main grooves 2. Specifically, the depth of the lug grooves 3 is 90 to 110% of the depth D of the main grooves 2. Setting the depth of the lug grooves 3 to be equal to the depth D of the main grooves 2 enables good drainage and traction performance to be maintained through the final stage of the wear life. However, making the lug grooves 3 deeper causes reduction in the rigidity of the shoulder blocks 6.

Figure 3:
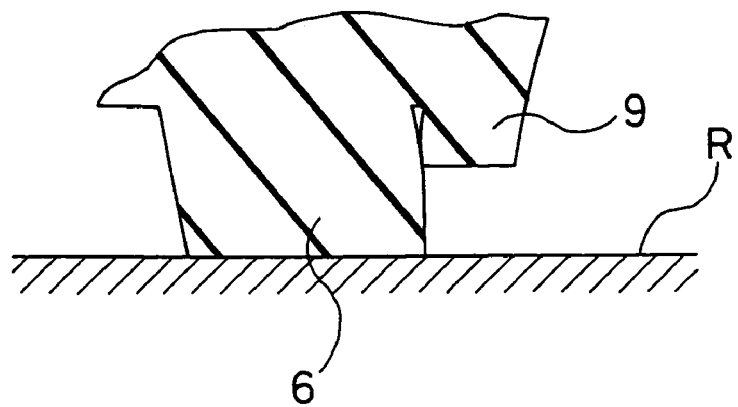
FIG. 3 is a cross-sectional view showing a shoulder block and a non-contact rib of the pneumatic tire of the present invention in the state that the tire is in contact with the ground.

In the aforementioned heavy-duty pneumatic tire, a non-contact rib 9 is formed in a serial configuration in the tire circumferential direction in a buttress portion 8 (which is a portion outside a ground contact region in the tire width direction, and which does not come into contact with the ground) outside the ground contact width. A sub groove 10 extended in the tire circumferential direction intervenes between each of the shoulder blocks 6 and the non-contact rib 9. In the state that the tire is not in contact with the ground, the non-contact rib 9 is left away from the shoulder blocks 6. As shown in FIG. 3, in the state that the tire is in contact with a road surface R, the non-contact rib 9 comes into contact with the side faces of the shoulder blocks 6.

In the state that the tire is in contact with the ground, the non-contact rib 9 formed in the buttress portion 8 supports the shoulder blocks 6, divided by the lug grooves 3, at the side faces thereof. Even in the case that the depth of the lug grooves 3 is set to be equal to the depth D of the main grooves 2 in order to maintain the good drainage and traction performance through the final stage of the wear life, it is possible to reinforce the rigidity of the shoulder blocks 6, and to suppress the occurrence of the heel-and-toe wear.

Preferably, the height d of the non-contact rib 9 to the depth D of the main grooves 2 satisfies a relation of $0.2 \leq d/D \leq 0.5$. When this ratio d/D is less than 0.2, an effect of supporting the shoulder blocks 6 is reduced, and the heel-and-toe wear is more likely to occur. When the ratio d/D exceeds 0.5, the non-contact rib 9 comes into contact with the ground before the middle stage of the wear life when the rigidity of the blocks need to be reinforced. Accordingly, the effect of supporting the shoulder blocks 6 is reduced, and the heel-and-toe wear is more likely to occur.

Preferably, the distance Y between the non-contact rib 9 and the shoulder blocks 6 satisfies a relation $0.2 \leq Y/d \leq 0.7$. When this ratio Y/d is less than 0.2, it is likely that cracks occur in the bottom of the sub groove 10 formed between each of the shoulder blocks 6 and the non-contact rib 9. When the ratio Y/d is more than 0.7, the shoulder blocks 6 and the non-contact rib 9 do not come into contact with each other in the state where the tire is in contact with the ground, and thus the heel-and-toe wear is more likely to occur.

The width w of the non-contact rib 9 is not particularly limited, since the effect of suppressing the heel-and-toe wear can be obtained if the aforementioned relations are satisfied. However, if the width w is excessively large, it is likely that the quality of the shoulder portion 7 for leasing the heat is deteriorated, and thus the durability is reduced. Therefore, it is preferable that the width w of the non-contact rib 9 to a width W of the shoulder blocks satisfies a relation $w/W < 0.5$.

Figure 4:
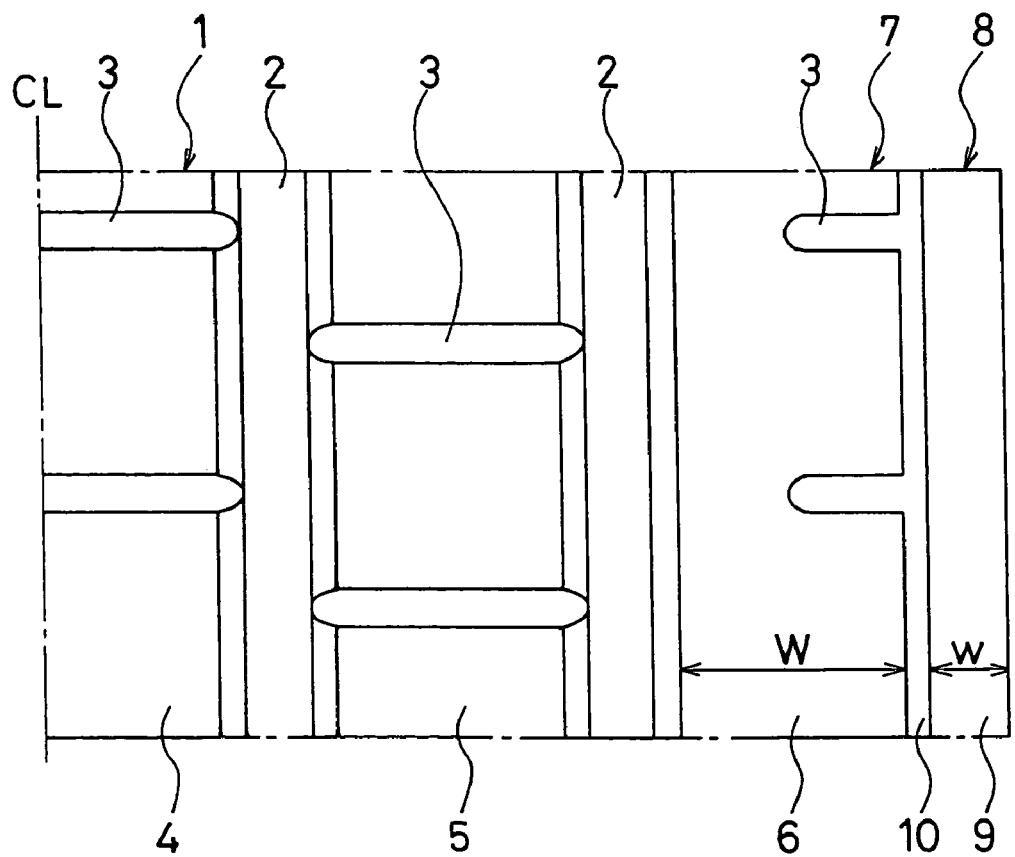
FIG. 4 is a planar view showing a main portion of a tread pattern of a pneumatic tire according to another embodiment of the present invention.

The description in the aforementioned embodiment has been given of the case that the elevation is provided in each of the lug grooves located in the shoulder portion. However, the elevation needs not necessarily to be provided in the present invention. Each of the lug grooves located in the shoulder portion needs not necessarily to be completely divided into the shoulder blocks, either. If at least an open end would be provided to the outside in the tire width direction, this serves for the object of the embodiment. For example, even in the case of a tread pattern being as shown in FIG. 4, it is possible to suppress the occurrence of the heel-and-toe wear in the rib-shaped shoulder blocks 6 which are not completely divided by the lug grooves 3.

The preferred embodiments of the present invention have been described in detail above, but it should be understood that various modifications, substitutions, and replacements can be made without departing from the spirit and the scope of the present invention specified by the appended claims.

Next, a description will be given of results of tests performed for pneumatic tires actually manufactured. Tires of examples 1 to 4 are manufactured using heavy-duty pneumatic tires (tire size: 11R22.5), whose shoulder portion is divided into the plurality of shoulder blocks in the tire circumferential direction, and wherein the depth of lug grooves between the shoulder blocks are set to be equal to the depth of the main grooves. The non-contact rib is provided to the buttress portion outside the ground contact width as shown in FIGS. 1 and 2 in the examples 1 to 4, and the sizes of the non-contact ribs are varied from one example to another. In addition, a tire of the conventional example without the non-contact rib is manufactured for the comparison.

These tested tires are evaluated in terms of the heel-and-toe wear by the following test method, and the results thereof are shown in Table 1.

Heal-and-Toe Wear:

Each tested tire is assembled to a wheel (rim size: 22.5×7.50) and then fitted to a truck to be run under the conditions of an inflation pressure of 700 kPa and a load of 27 kN. Differences in height, generated by heel-and-toe wear, among each of the shoulder blocks are measured when each tire is worn by 20% and 50% of the depth D of the main grooves, and then summed. The evaluation results are indicated by indices with a result of the conventional example being defined as 100. Smaller indices mean the occurrence of less heel-and-toe wear.

TABLE 1

|  | Conventional Example | Example 1 | Example 2 | Example 3 | Example 4 |
| --- | --- | --- | --- | --- | --- |
| d/D | — | 0.20 | 0.30 | 0.50 | 0.30 |
| Y/d | — | 0.70 | 0.50 | 0.20 | 0.50 |
| w/W | — | 0.30 | 0.30 | 0.30 | 0.44 |
| Heel-and-toe wear | 100 | 85 | 80 | 85 | 80 |

As apparent from this Table 1, the tires of the examples 1 to 4 cause less heel-and-toe wear to occur in the shoulder blocks than the tire of the conventional example does. Meanwhile, with regard to the tires of the examples 1 to 4, since the depth of the lug groove between each two adjacent of the shoulder blocks is set to be equal to the depth of the main grooves, a good drainage and traction performance can be hoped for from the initial stage through the final stage of the wear life.

As described above, according to the present invention, in the heavy-duty pneumatic tire, whose shoulder portion is divided into the plurality of shoulder blocks in the tire circumferential direction, and in which the depth of the lug groove between each two adjacent of the shoulder blocks is set to be equal to the depth of the main grooves, the non-contact rib is provided, in a continuous form in the tire circumferential direction, to the buttress portion outside the ground contact width so as to come into contact with the side faces of the shoulder blocks in the state that the tire is in contact with the ground with a specified inflation pressure and a specified load. Accordingly, it is possible to suppress the occurrence of the heel-and-toe wear in the shoulder blocks while maintaining good drainage and traction performance through the final stage of the wear life.

What is claimed is:

1. A heavy-duty pneumatic tire, whose shoulder portion is divided into a plurality of shoulder blocks in the tire circumferential direction, and in which the depth of lug grooves disposed between the shoulder blocks is set in a range of 90% to 110% of the depth of a main groove thereof the pneumatic tire comprising:

a non-contact rib which does not come into contact with the ground outside a ground contact width, the non-contact rib being provided, in a serial configuration in the tire circumferential direction, to a buttress portion outside the ground contact width, so as to come into contact with the side faces of the shoulder blocks in a state that the tire is in contact with the ground with a specified inflation pressure and a specified load, and a narrow groove disposed between the shoulder blocks and the non-contact rib, wherein the side faces of the shoulder blocks extend linearly from a ground contacting surface of the shoulder blocks to a bottom of the narrow groove in a cross-section of the tire.

2. The heavy-duty pneumatic tire according to claim 1, wherein the height d of the non-contact rib to the depth D of the main grooves satisfies a relation of $0.2 \leq d/D \leq 0.5$, and the distance Y between the non-contact rib and the shoulder block satisfies a relation of $0.2 \leq Y/d \leq 0.7$.

3. The heavy-duty pneumatic tire according to claim 1, wherein the width w of the non-contact rib to the width W of the shoulder blocks satisfies a relation of $w/W < 0.5$.

* * * * *